(12) United States Patent
Sohum et al.

(10) Patent No.: US 11,803,875 B2
(45) Date of Patent: Oct. 31, 2023

(54) METHOD AND SYSTEM TO UTILIZE ADVERTISEMENT FRAUD DATA FOR BLACKLISTING FRAUDULENT ENTITIES

(71) Applicant: Affle (India) Limited, Mumbai (IN)

(72) Inventors: Anuj Khanna Sohum, Singapore (SG); Charles Yong Jien Foong, Singapore (SG); Anurag Singh, Gurgaon (IN)

(73) Assignee: Affle (India) Limited, Mumbai (IN)

( * ) Notice: Subject to any disclaimer, the term of this patent is extended or adjusted under 35 U.S.C. 154(b) by 47 days.

(21) Appl. No.: 17/443,181

(22) Filed: Jul. 21, 2021

(65) Prior Publication Data

US 2021/0350409 A1 Nov. 11, 2021

Related U.S. Application Data

(63) Continuation of application No. 16/399,716, filed on Apr. 30, 2019, now abandoned.

(30) Foreign Application Priority Data

Apr. 30, 2018 (IN) .............................. 201821016232

(51) Int. Cl.
| | | |
|---|---|---|
| *G06Q 30/02* | (2023.01) | |
| *G06Q 30/0241* | (2023.01) | |
| *G06N 20/00* | (2019.01) | |
| *G06F 21/31* | (2013.01) | |

(52) U.S. Cl.
CPC ....... *G06Q 30/0248* (2013.01); *G06F 21/316* (2013.01); *G06N 20/00* (2019.01)

(58) Field of Classification Search
CPC ... G06Q 30/0248; G06N 20/00; G06F 21/316
See application file for complete search history.

(56) References Cited

U.S. PATENT DOCUMENTS

| | | | |
|---|---|---|---|
| 2017/0195353 A1* | 7/2017 | Taylor | H04L 63/1425 |
| 2017/0287014 A1* | 10/2017 | Vu | G06Q 30/0269 |
| 2018/0108016 A1* | 4/2018 | Jin | G06Q 20/405 |
| 2019/0333101 A1 | 10/2019 | Sohum et al. | |

* cited by examiner

*Primary Examiner* — Scott C Anderson
(74) *Attorney, Agent, or Firm* — Kolisch Hartwell, P.C.

(57) ABSTRACT

The present disclosure provides a system for utilization of an advertisement fraud data to blacklist or whitelist one or more entities. The system includes a first step of collecting the advertisement fraud data associated with online advertisement and commerce fraud. The system includes another step of creating a blacklist of one or more entities from the collected advertisement fraud data. The system includes another step of blocking the one or more entities present in the created blacklist in real-time. The system includes another step of generating a whitelist of one or more entities from the created blacklist of the one or more entities. The system includes yet another step of optimizing the blacklist of the one or more entities in real-time.

19 Claims, 3 Drawing Sheets

METHOD AND SYSTEM TO UTILIZE ADVERTISEMENT FRAUD DATA FOR BLACKLISTING FRAUDULENT ENTITIES

CROSS-REFERENCE TO RELATED APPLICATIONS

This application is a continuation of U.S. patent application Ser. No. 16/399,716, filed Apr. 30, 2019, and entitled "Method and System to Utilize Advertisement Fraud Data for Blacklisting Fraudulent Entities", which application is incorporated herein by reference in its entirety for all purposes.

TECHNICAL FIELD

The present disclosure relates to the field of fraud detection systems, and in particular, relates to a method and system to utilize an advertisement fraud data to blacklist or whitelist one or more entities.

INTRODUCTION

With the advancements in technology over the last few years, users have predominantly shifted towards smartphones for accessing multimedia content. Nowadays, users access content through a number of applications available for download through various online application stores. Businesses (Advertisers) have started focusing on generating revenue by targeting consumers through these applications. In addition, businesses have started investing heavily in doing business with these applications. Moreover, businesses (publishers and/or advertising networks) have started developing capable advertisement applications for serving advertisements through these applications. These advertisements are published in real time or fixed placements through these applications and watched by the users. The advertisers are benefited in terms of internet traffic generated by clicking, taking action like installing or on watching these advertisements. However, certain online publishers and advertising networks working with these publishers take undue advantage of this in order to generate high revenues. These online publishers and advertising networks employ fraudulent techniques in order to generate clicks or to increase actions like increasing number of application install for the advertisers through fraudulent means. This results in a loss of advertisers marketing budget spent as many times these publishers claim a normal user-initiated action (Organic action, e.g. Organic Install) as one initiated by them or at times the clicks or application installs are not driven by humans at all and instead by bots. There is a consistent need to stop publishers from performing such types of click fraud and transaction fraud.

SUMMARY

The present disclosure provides a computer system. The computer system includes one or more processors and a memory. The memory is coupled to the one or more processors. The memory stores instructions. The instructions are executed by the one or more processors. The execution of instructions causes the one or more processors to perform a method for utilization of an advertisement fraud data to blacklist or whitelist one or more entities. The method includes a first step of collecting the advertisement fraud data associated with online advertisement and commerce fraud in real-time at a fraud detection system. The method includes another step of creating a blacklist of one or more entities from the collected advertisement fraud data at the fraud detection system. The method includes yet another step of blocking the one or more entities present in the created blacklist in real-time at the fraud detection system. The method includes yet another step of generating a whitelist of one or more entities from the created blacklist of the one or more entities at the fraud detection system. The method includes yet another step of optimizing the blacklist of the one or more entities in real-time at the fraud detection system. The advertisement fraud data is collected from a plurality of sources. The advertisement fraud data is collected based on a plurality of techniques. The blacklist of the one or more entities is created by a blacklisting system. The blacklist of the one or more entities is created based on a plurality of parameters. The blacklist of the one or more entities is created based on a confidence score calculated from a plurality of reason codes. The one or more entities are blocked based on the plurality of parameters. The plurality of parameters includes publisher type, device ID, device type, lull period of time, validity period, traffic and IP address. The whitelist of the one or more entities is created by the blacklisting system. The whitelist of the one or more entities is created based on the plurality of parameters. The whitelist of the one or more entities is created based on a scoring mechanism. The optimizing of the blacklist of the one or more entities is done for fine tuning and improving accuracy of the created blacklist. The optimizing is done using a feedback loop to ensure that no invalid blacklisting of the one or more entities is done.

BRIEF DESCRIPTION OF DRAWINGS

Figure 1:
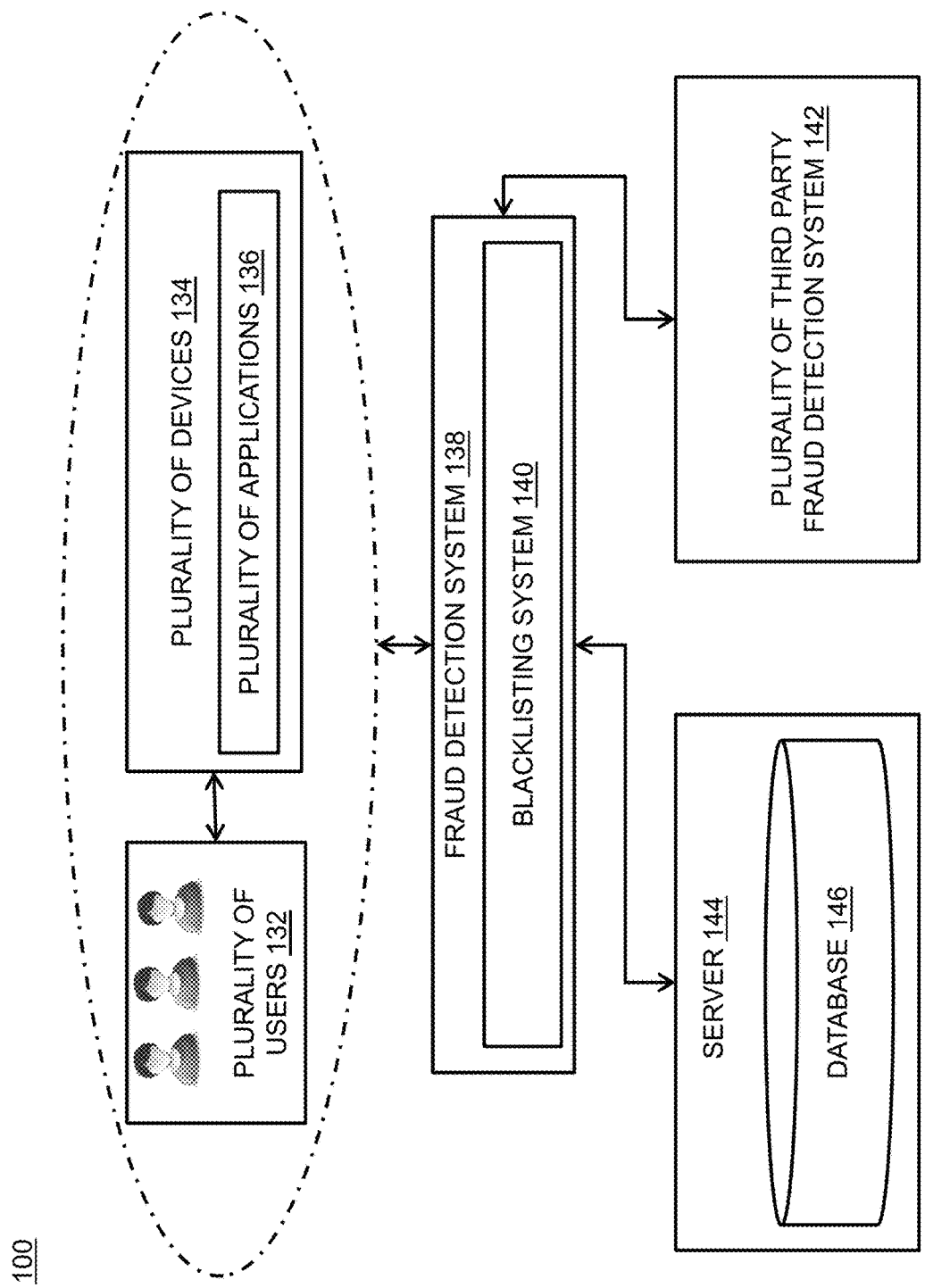
Figure 2:
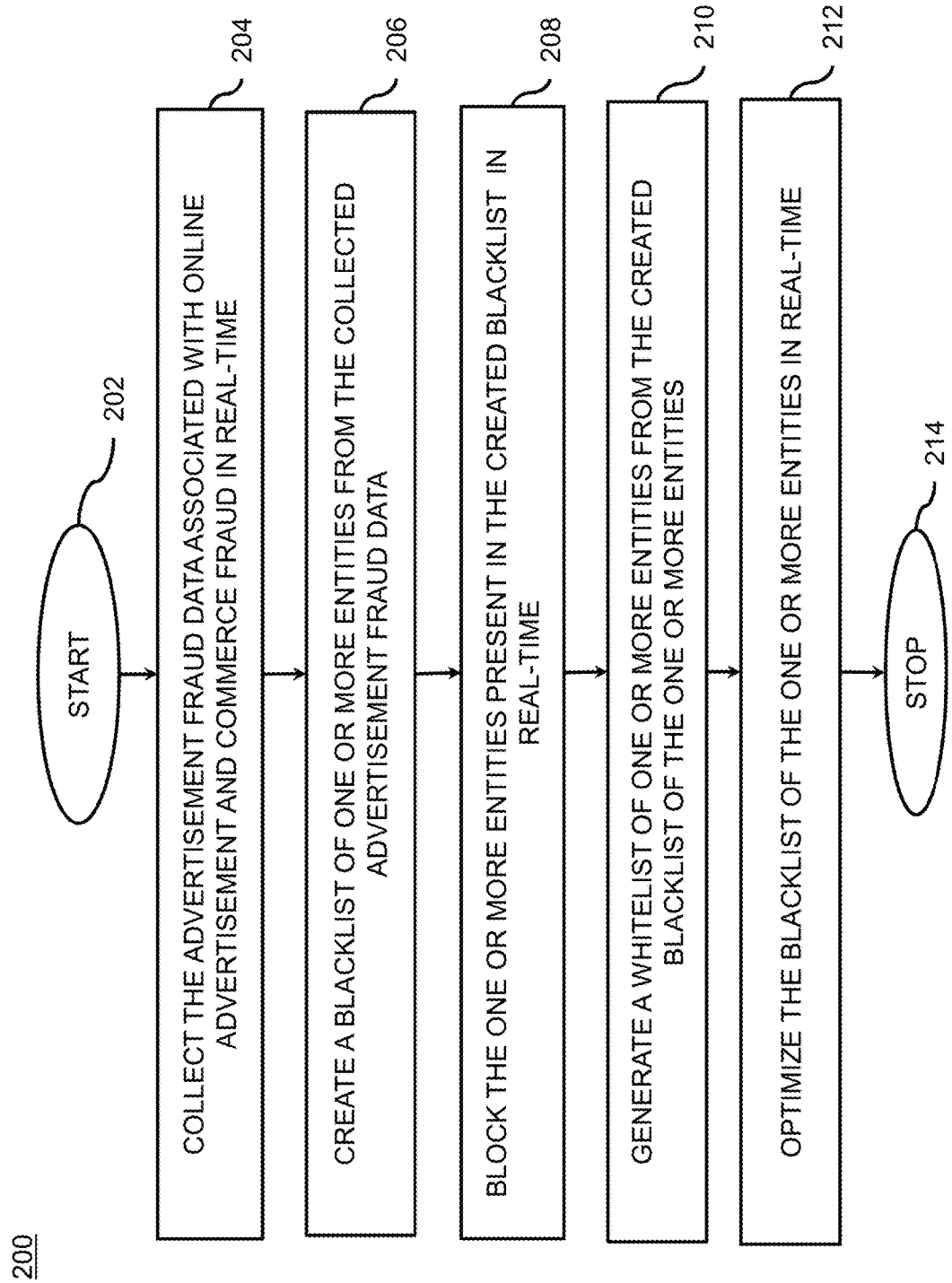
Figure 3:
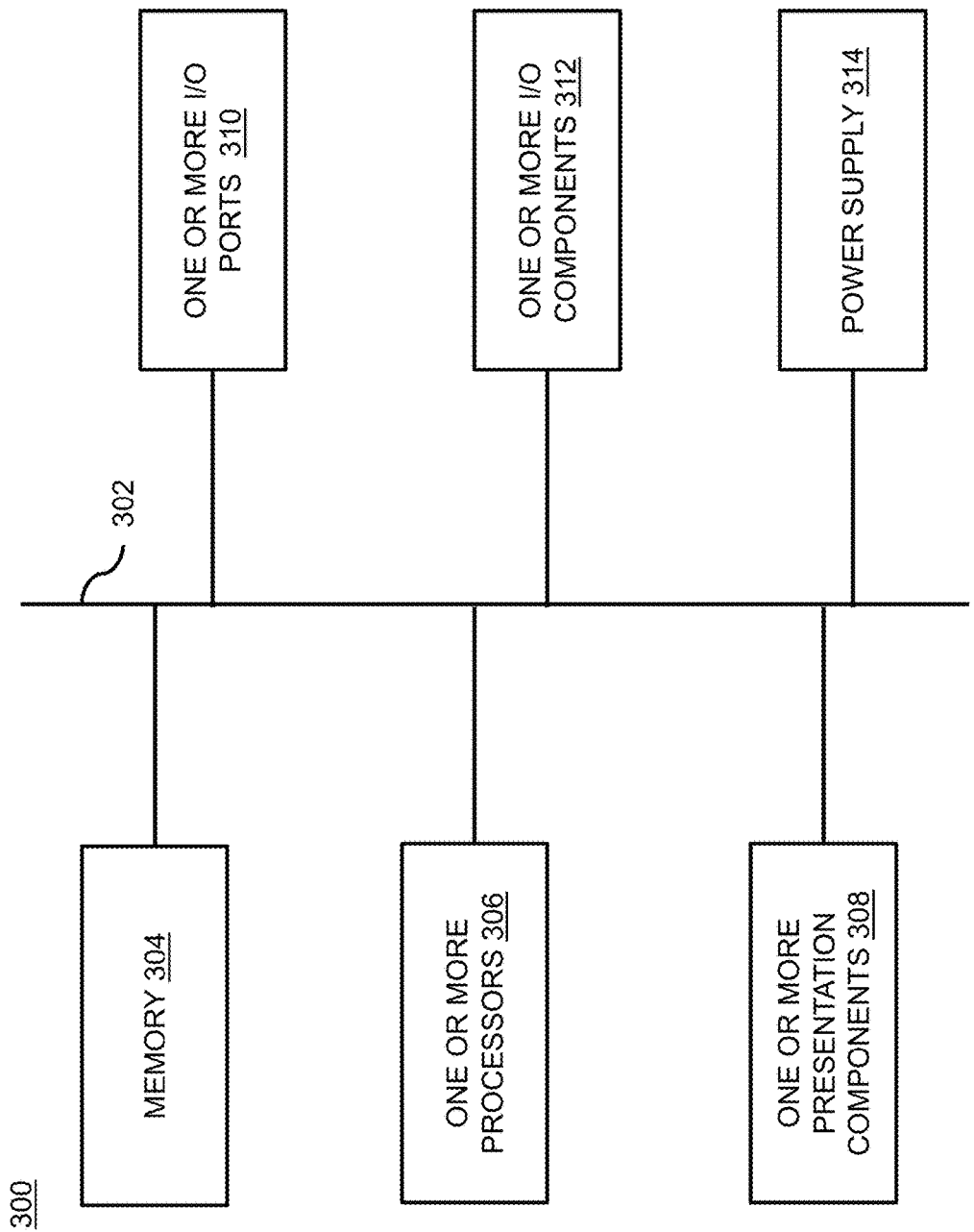

Having thus described the invention in general terms, references will now be made to the accompanying figures, wherein:

FIG. 1 illustrates an interactive computing environment between users and one or more components for blacklisting or whitelisting one or more entities performing fraud in advertisements, in accordance with various embodiments of the present disclosure;

FIG. 2 illustrates a flow chart of a method to utilize an advertisement fraud data to blacklist or whitelist one or more entities, in accordance with various embodiments of the present disclosure; and FIG. 3 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates an interactive computing environment 100 between users and one or more components for blacklisting and whitelisting one or more entities performing fraud in advertisements, in accordance with various embodiments of the present disclosure. The fraud in advertisements corresponds to click fraud, transaction fraud and the like. The click fraud corresponds to regular or constant clicking by a user or a group of users on an advertisement in order to generate more revenue for a publisher. The transaction fraud takes place when the publisher applies fraudulent techniques to drive fake installs of applications associated with an advertiser in order to generate more revenue. The interactive computing environment 100 shows the interaction between various entities for blacklisting the one or more entities performing fraud in advertisements.

The advertisements are displayed in third party applications developed by application developers. The application developers are known as publishers. The advertisements may include a graphical advertisement, a video advertisement, a banner advertisement and the like. The interactive computing environment 100 shows a relationship between various entities involved in detection of fraud in the advertisements. The advertisement fraud is detected by using multiple fraud detection techniques.

The interactive computing environment 100 includes a plurality of users 132, a plurality of devices 134, a plurality of applications 136, a fraud detection system 138, a blacklisting system 140 and a plurality of third party fraud detection system 142. In addition, the interactive computing environment 100 includes a server 144 and a database 146. Each of the components of the interactive computing environment 100 interacts with each other to enable blacklisting of one or more entities performing fraud in advertisements. The interactive computing environment 100 aids in tackling online advertisement fraud in applications in real time. The online advertisement fraud in applications refers to use of fraudulent techniques by publishers to generate fake online traffic. The online traffic is faked through techniques such as click fraud, transaction fraud and the like. The click fraud refers to the generation of fraudulent clicks through online bots which are not identifiable to the advertisers who treat the same as genuine online traffic. The transaction fraud refers to enabling application installs by providing some kind of incentive to users in real time or making claims of initiating the install via fake clicks and bots (as described above in the application).

In addition, a user of the plurality of users 132 is associated with a corresponding device of the plurality of devices 134. The plurality of users 132 are individuals or persons who access online multimedia content on the respective plurality of devices 134. Each user of the plurality of users 132 is accessing an application of the plurality of applications 136 on the corresponding device of the plurality of devices 134. Further, the plurality of devices 134 includes a smartphone, portable communication device, fixed communication device, laptop, desktop, PDA, palmtop, setup boxes, smart televisions and the like. Each device of the plurality of devices 134 is an Internet-enabled device for allowing each user of the plurality of users 132 to access corresponding application of the plurality of applications 136. The plurality of applications 136 is used to display content to the plurality of users 132. The content may include one or more publisher content, one or more video content and the like. The plurality of applications 136 or publishers accessed by the plurality of users 132 may show content related to interests of the plurality of users 132. In an example, the plurality of users 132 may be interested in watching online videos, reading blogs, play online games, accessing social networking sites and the like.

The plurality of applications 136 are software applications developed by third-party online publishers. The plurality of applications 136 are advertisement supporting applications. The plurality of applications 136 may be any type of application such as a gaming application, a utility application, a service based application and the like. The plurality of applications 136 provides space, areas or a part of their application pages for advertising purposes. These areas or spaces on the application pages are referred to as advertisement slots. The application page can have the various advertisement slots depending on choice of each of the plurality of applications 136. The plurality of applications 136 advertises products, services or businesses to the plurality of users 132 for generating revenue.

The plurality of users 132 is accessing the plurality of applications 136 in real time on the corresponding plurality of devices 134. The online plurality of applications 136 continuously displays advertisements through the plurality of devices 134. The plurality of users 132 encounters the advertisements while accessing the plurality of applications 136. The advertisements may include text advertisements, video advertisements, graphic advertisements and the like. The plurality of users 132 may click on the advertisements and re-directed to a website of the advertiser associated with the corresponding clicked advertisement. The advertisements are provided by advertisers. The advertisers provide advertisements to the plurality of applications 136 for displaying on their application. The advertisements are placed on the advertisement slots in the plurality of applications 136.

The one or more advertisers purchase the advertisement slots from the one or more publishers. The advertisements may be served based on a real-time bidding technique or a direct contract between the advertisers and the publishers. The advertisers may provide the advertisements to advertising networks and information associated with advertising campaigns. The advertisement networks enable display of the advertisements in real time on the plurality of applications 136 on behalf of the advertisers. The advertising networks are entities that connect the advertisers to websites and applications that are willing to serve advertisements.

Further, the fraud detection system 138 is associated with the plurality of applications 136 or the publishers. The fraud detection system 138 is linked with multiple online publishers in real time. The online publishers correspond to the plurality of applications 136. The fraud detection system 138 is a platform for detecting click fraud and transaction fraud done by the online publishers in real time. The fraud detection system 138 performs the detection of fraud in the advertisements in real time. The fraud detection system 138 employs multiple techniques to detect fraud detection by the online publishers in real time. The fraud detection system 138 detects fraudulent advertising traffic initiated through the plurality of applications 136. The fraud detection system 138 collects an advertisement fraud data from a plurality of sources. The plurality of sources includes the plurality of devices 134 and the plurality of third party fraud detection system 142. The advertisement fraud data is associated with online advertisement and commerce fraud. Further, the fraud detection system 138 collects the advertisement fraud data based on a plurality of techniques. Furthermore, the plurality of techniques include tracking online activity of the plurality of users 132, tracking interaction of the plurality of users 132 with advertisements, utilization of historical data, and the like. In an example, the advertisement fraud data corresponds to fraud related data collected from the plurality of devices 134 associated with the plurality of users 132. In another example, the advertisement fraud data corresponds to fraud related data collected from the plurality of third party fraud detection system 142. The advertisement fraud data include application size, time to download, time to run, redirection time, click to install, click to run, user click time, device load time and time to run. In addition, the advertisement fraud data include time to install, network download time, application usage time, application idle time and application opening time.

The fraud detection system 138 tracks online activity of the plurality of users 132. Further, the fraud detection system 138 tracks interaction of the plurality of users 132 with the advertisements in real time. The fraud detection system 138 utilizes a past set of recorded data. The past set of recorded data corresponds to data associated with a number of installs and number of clicks generated through the advertisements over a period of time. The fraud detection system 138 detects fraudulent advertising traffic initiated through the plurality of applications 136. The fraudulent advertising traffic is referred to the traffic generated through click initiation by click bots, click spamming, ad stacking and the like.

The fraud detection system 138 determines which publishers of the plurality of applications 136 are performing fraudulent activities in real time. The fraud detection system 138 deters, blocks or intercepts the publishers who generate more clicks and installs through fraudulent means. The fraud detection system 138 may take necessary action against publishers who are generating revenue by fraudulent means. In addition, the fraud detection system 138 blocks the publishers who perform fraudulent activities such as click spamming to simulate fake traffic. Moreover, the fraud detection system 138 alerts the advertisers about the fraudulent publishers in real time. Accordingly, the advertisers may take appropriate action against the fraudulent publishers.

In an embodiment of the present disclosure, the fraud detection system 138 performs fraud detection through multiple techniques. Each technique generates fraud data in real time which is utilized for blacklisting purposes. Also, the fraud data is analyzed in real time. The fraud detection system 138 includes the blacklisting system 140. The blacklisting system 140 creates a blacklist of the one or more entities that are performing fraud in the advertisements. Also, the blacklisting system 140 creates the blacklist of the one or more entities based on the collected advertisement fraud data. In addition, the blacklisting system 140 enables whitelisting of one or more entities determined to be not performing fraud in the advertisements. The one or more entities may include publishers, ad networks and the like. The blacklisting system 140 creates the blacklist of the one or more entities based on a plurality of parameters. In addition, the plurality of parameters include publisher type, device ID, device type, lull period of time, validity period, traffic, IP address, and the like.

Also, the blacklisting system 140 creates the blacklist of the one or more entities based on a confidence score calculated from a plurality of reason codes. The blacklisting system 140 blocks the one or more entities present in the created blacklist based on the plurality of parameters. The plurality of parameters include device IDs, IP addresses, device types, lull period of time, publisher type, validity period, traffic and the like. In an embodiment of the present disclosure, the blacklisting system 140 has a capability of blocking any traffic through the blacklisted devices and IP addresses in real time. In an embodiment, the confidence score is calculated based on analysis of the advertisement fraud data. The confidence score is calculated in real time. The confidence score is calculated to detect fraud done by the online publisher in displaying the advertisements on the plurality of devices 134.

In an embodiment of the present disclosure, the blacklisting system 140 utilizes a whitelist system. The whitelist system is used for the blacklisted items only. The blacklisting system 140 generates a whitelist of the one or more entities. The blacklisting system 140 generates the whitelist of the one or more entities based on the created blacklist of the one or more entities. In addition, the blacklisting system 140 generates the whitelist of the one or more entities based on the plurality of parameters. The blacklisting system 140 utilizes a scoring mechanism for whitelisting the one or more blacklisted entities. The blacklisting system 140 whitelists or unblacklists the one or more entities with the lowest score. The blacklisting system 140 ensures that no over blacklisting is done and a balance is maintained. In an embodiment, the scoring mechanism scores each of the one or more entities present in the whitelist or the blacklist. The scoring mechanism performs the scoring using past advertiser data, and current advertiser data. The scoring mechanism performs the scoring in real time.

In addition, the blacklisting system 140 acts as a blacklisting optimizer. The blacklisting system 140 blacklists the one or more entities in real-time. The blacklisting system 140 optimizes the blacklisting of the one or more entities based on the plurality of parameters. In an embodiment of the present disclosure, the blacklisting system 140 may optimize the blacklist based on a type of IP address, device type and the like. In another embodiment of the present disclosure, the blacklisting system 140 may optimize the blacklist based on a type of publisher. In yet another embodiment of the present disclosure, the blacklisting system 140 performs a check before blacklisting a parameter of the plurality of parameters or combination of the plurality of parameters. The blacklisting system 140 may calculate and show the confidence score of the plurality of parameters based on fit from the plurality of reason codes. In an example, if the blacklisting system 140 wants to blacklist an IP address, the blacklisting system 140 may inform a score of the IP address, abnormally high frequency of installs from the IP address, IP is from a suspicious TOR network, installs came from a lull period (say 3 am in the morning) and a suspiciously high install rate for this period of time for the particular application and recommend to blacklist the device ID as the device ID has a high fraud score. In an embodiment of the present disclosure, the scoring is done via adding fraud score for each reason code of the plurality of reason codes.

The blacklisting system 140 optimizes the blacklist of the one or more entities to fine tune and improves accuracy of the created blacklist. In an embodiment of the present disclosure, the blacklisting system 140 optimizes the blacklist of the one or more entities using a feedback loop to ensure that no invalid blacklisting of the one or more entities is done. The blacklisting system 140 analyzes whether the user of the plurality of users 132 has made any engagements and any purchases post install. Accordingly, the blacklisting system 140 ensures that no blacklist of valid installs is possible.

In an embodiment of the present disclosure, the plurality of reason codes may be added together for a particular parameter of the plurality of parameters as an overall fraud score or the confidence score. The plurality of reason codes include click to install time, hourly distribution, anonymous installs, organic stuffing, invalid device IDs, IP frequency and incent mixing. The plurality of reason codes enables better confidence in the blacklisting of the one or more entities. In an embodiment of the present disclosure, the blacklisting optimizer utilizes weights on each above mentioned parameter of the plurality of parameters and multiplies the same to each of the plurality of reason codes to normalize the results. In an embodiment of the present disclosure, the blacklisting system 140 determines final score or overall fraud score based on the score for each type of fraud detection algorithm. The final score is used to blacklist or whitelist the one or more entities.

In an embodiment of the present disclosure, the blacklisting system 140 includes the blacklist optimizer and a whitelist optimizer. The whitelist optimizer tracks false positive blacklisting to ensure over blacklisting is not done. The whitelist optimizer utilizes machine learning and artificial intelligence algorithms. The whitelist optimizer is used to train artificial intelligence to ensure that real time fraud is blocking and to handle post back. In an embodiment of the present disclosure, the blacklisting system 140 utilizes the scoring mechanism to rank the whitelists of the one or more entities with a score. The blacklisting system 140 evaluates the one or more entities of the whitelist to be most likely to be the one or more entities of the blacklist. In an embodiment of the present disclosure, the blacklisting system 140 adds all known good one or more entities to the whitelist to ensure engagement post install or purchases within the application of the plurality of applications 136. In an embodiment of the present disclosure, the blacklisting system 140 provides an expiry to the whitelist of the one or more entities in different countries as people change phones and sometimes IP addresses are recycled. In an embodiment of the present disclosure, the blacklisting system 140 tests the one or more entities of the blacklist to check whether the one or more entities of the blacklist can be now whitelisted or not.

In an embodiment of the present disclosure, the blacklisting algorithm and whitelisting algorithm provide the score in real time for confidence if a particular parameter should be blacklisted or whitelisted. The blacklisting system 140 auto-blacklists the parameter based upon the confidence level or the score.

In an embodiment of the present disclosure, the blacklisting system 140 performs correlation of the collected advertisement fraud data from the plurality of sources in real time. In an embodiment of the present disclosure, the blacklisting system 140 receives the advertisement fraud data from the fraud detection system 138 in real time. In an embodiment of the present disclosure, the blacklisting system 140 calculates the confidence score for the advertisement fraud data generated from each type of fraud detection algorithm. The confidence score may be utilized to determine a most reliable fraud detection data in order to blacklist an entity.

In an embodiment of the present disclosure, the blacklisting system 140 blacklists the device IDs, the IP addresses and the like based on the confidence score for each of the fraud detection algorithms. In an embodiment of the present disclosure, the blacklisting system 140 whitelists the device IDs, the IP addresses and the like based on the confidence score for each of the fraud detection algorithms. In an embodiment of the present disclosure, the blacklisting system 140 uses machine learning and artificial intelligence to determine the confidence score for all relevant fraud detection algorithms.

In an embodiment of the present disclosure, the blacklisting system 140 automatically determines and finds correlations of fraud using the advertisement fraud data from various fraud detection techniques. In an embodiment of the present disclosure, the blacklisting system 140 may consider the fraud data of each fraud detection technique separately for confidence analysis. In another embodiment of the present disclosure, the blacklisting system 140 may consider the fraud data of a subset of fraud detection techniques in order to determine the fraud accurately and blacklist the one or more entities.

In an embodiment of the present disclosure, the blacklisting system 140 utilizes combination of the advertisement fraud data from each of the fraud detection algorithms. The blacklisting system 140 determines whether to blacklist or whitelist an entity of the one or more entities based on combination of the advertisement fraud data from each of the fraud detection algorithms. The blacklisting system 140 blacklists or whitelists the one or more entities based on the combination data with greater accuracy.

In an embodiment of the present disclosure, the blacklisting system 140 blacklists or whitelists the one or more entities based on statistical analysis of click to install timings. In another embodiment of the present disclosure, the blacklisting system 140 blacklists or whitelists the one or more entities based on statistical analysis of installs based upon lull periods of time. In yet another embodiment of the present disclosure, the blacklisting system 140 blacklists or whitelists the one or more entities based on statistical analysis of IP addresses. In yet another embodiment of the present disclosure, the blacklisting system 140 blacklists or whitelists the one or more entities based on statistical analysis of device IDs.

In an embodiment of the present disclosure, the blacklisting system 140 is linked with the plurality of third party fraud detection system 142. The plurality of third party fraud detection system 142 corresponds to various third party fraud detection systems which detect fraud in advertisements. The blacklisting system 140 collects the advertisement fraud data from the plurality of third party fraud detection system 142 in real time. The blacklisting system 140 utilizes the advertisement fraud data for fine tuning the blacklists and whitelists and improving the accuracy of the blacklisting. The blacklisting system 140 may compare the advertisement fraud data from the plurality of third party fraud detection system 142 with the advertisement fraud data of the fraud detection system 138. The comparison may be used to improve the confidence score for the blacklisting system 140.

In an embodiment of the present disclosure, the blacklisting system 140 utilizes the combination of multiple fraud detection techniques in order to blacklist or whitelist a publisher, a device ID, IP address and the like. In an embodiment of the present disclosure, the blacklisting system 140 may optimize the combination of the fraud detection techniques for different advertisers. In an embodiment of the present disclosure, the blacklisting system 140 may optimize the fraud detection techniques based on a category of advertisers. In an embodiment of the present disclosure, the blacklisting system 140 may perform scoring for each type of fraud detection technique and may blacklist or whitelist an entity of the one or more entities based on the scoring. In an embodiment of the present disclosure, the blacklisting system 140 may build the confidence score for each type of fraud detection technique for each category of advertisers.

In an embodiment of the present disclosure, the blacklisting system 140 may utilize the confidence score of at least two fraud detection techniques to blacklist or whitelist the one or more entities displaying advertisements. The advertisements are displayed on the plurality of applications 136 associated with that particular category of advertisers. In an embodiment of the present disclosure, the blacklisting system 140 may take into account a type of fraud detection technique relevant or accurate or suitable for each advertiser based on the plurality of parameters of the plurality of applications 136. In an embodiment of the present disclosure, the blacklisting system 140 may take into account the past data of the advertiser. Further, the blacklisting system determines which type of fraud detection technique can yield best results for the advertiser and that can help in blacklisting or whitelist a publisher based on the consent of the advertiser. In an embodiment of the present disclosure, the blacklisting system 140 may recommend a list of publishers or the one or more entities that should be blacklisted or whitelisted. The recommendation may be made based on the past advertiser data and the current advertiser data or the mapping of both the data.

In an embodiment of the present disclosure, the blacklisting system 140 may prioritize methods for fraud detection for each type or category of the advertiser. In addition, the blacklisting system 140 utilizes the priority to blacklist or whitelist the advertiser. In an embodiment of the present disclosure, the blacklisting system 140 may utilize the data associated with a particular blacklisted publisher of a particular category to blacklist or whitelist target publishers of the same category. In an embodiment of the present disclosure, the blacklisting system 140 may use supervised machine learning and non-supervised machine learning. In an embodiment of the present disclosure, the blacklisting system 140 may use algorithms to intelligently adapt itself to the continuous change in the data and related patterns.

Further, the blacklisting system 140 is linked to the server 144. In an embodiment of the present disclosure, the server 144 controls each and every operation performed by the blacklisting system 140. The server 144 includes the database 146. The database 146 may store the data associated with the blacklisting system 140. In an embodiment of the disclosure, the blacklisting system 140 communicates in real time to an ad server for suspected fraud cases that are at the borderline and uses active fraud detection to confirm fraud or not.

FIG. 2 illustrates a flow chart 200 for utilization of an advertisement fraud data to blacklist or whitelist one or more entities, in accordance with various embodiments of the present disclosure. It may be noted that to explain the process steps of flowchart 200, references will be made to the system elements of FIG. 1. It may also be noted that the flowchart 200 may have fewer or more number of steps.

The flowchart 200 initiates at step 202. Following step 202, at step 204, the fraud detection system 138 collects the advertisement fraud data associated with online advertisement and commerce fraud in real-time. At step 206, the fraud detection system 138 creates the blacklist of the one or more entities from the collected advertisement fraud data. At step 208, the fraud detection system 138 blocks the one or more entities present in the created blacklist in real-time. At step 210, the fraud detection system 138 generates the whitelist of the one or more entities from the created blacklist of the one or more entities. At step 212, the fraud detection system 138 optimize the blacklist of the one or more entities in real-time. The flow chart 200 terminates at step 214.

FIG. 3 illustrates a block diagram of a device 300, in accordance with various embodiments of the present disclosure. The device 300 is a non-transitory computer readable storage medium. The device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the device 300 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The device 300 includes the one or more processors 306 that read data from various entities such as memory 304 or I/O components 312. The one or more presentation components 308 present data indications to the user or other device. Exemplary presentation components include a display device, speaker, printing component, vibrating component, etc. The one or more I/O ports 310 allow the device 300 to be logically coupled to other devices including the one or more I/O components 312, some of which may be built in. Illustrative components include a microphone, joystick, gamepad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer system comprising:
    one or more processors; and
    a memory coupled to the one or more processors, the memory for storing instructions which, when executed by the one or more processors, cause the one or more processors to perform a method for utilization of an advertisement fraud data to blacklist or whitelist one or more entities, the computer system comprising:
        collecting, at a fraud detection system, the advertisement fraud data associated with online advertisement and commerce fraud in real-time, wherein the advertisement fraud data is collected from a plurality of sources, wherein the advertisement fraud data is collected based on a plurality of techniques;
        creating, at the fraud detection system, a blacklist of one or more entities from the collected advertisement fraud data, wherein the blacklist of the one or more entities is created by a blacklisting system, wherein the blacklist of the one or more entities is created based on a plurality of parameters, and wherein the blacklist of the one or more entities is created based on a confidence score calculated from a plurality of reason codes corresponding to at least one of the plural parameters, wherein the calculation of the confidence score comprises adding the plural reason codes for each of the plural parameters;
        blocking, at the fraud detection system, the one or more entities present in the created blacklist in real-time, wherein the one or more entities are blocked based on the plurality of parameters, wherein the plurality of parameters comprises publisher type, device ID, device type, a time period, traffic and IP address;
        generating, at the fraud detection system, a whitelist of one or more entities from the created blacklist of the one or more entities, wherein the whitelist of the one or more entities is created by the blacklisting system, wherein the whitelist of the one or more entities is created based on the plurality of parameters, wherein the whitelist of the one or more entities is created based on a scoring mechanism; and
        optimizing, at the fraud detection system, the blacklist of the one or more entities in real-time, wherein the optimizing of the blacklist of the one or more entities comprises utilizing weights on each of the plural parameters and multiplying the same to each of the plural reason codes, wherein the optimizing is done for fine tuning and improving accuracy of the created blacklist, wherein the optimizing is done using a feedback loop to ensure that no invalid blacklisting of the one or more entities is done.

2. The computer system as recited in claim 1, wherein the plurality of sources comprises a plurality of devices associated with a plurality of users, and a plurality of third party fraud detection system.

3. The computer system as recited in claim 1, wherein the advertisement fraud data comprises application size, time to download, time to run, redirection time, click to install, click to run, user click time, device load time, time to run, time to install, network download time, application usage time, application idle time and application opening time.

4. The computer system as recited in claim 1, wherein the plurality of techniques comprises tracking online activity of the plurality of users, tracking interaction of the plurality of users with advertisements, and utilization of historical data.

5. The computer system as recited in claim 1, wherein the plurality of reason codes comprises at least one of click to install time, hourly distribution, anonymous installs, organic stuffing, invalid device ID, IP frequency, and incent mixing.

6. The computer system as recited in claim 1, wherein the blacklisting system comprises of a blacklist optimizer and a whitelist optimizer.

7. The computer system as recited in claim 1, wherein the scoring mechanism score each of the one or more entities, wherein the scoring mechanism perform the scoring using past advertiser data and current advertiser data, wherein the scoring mechanism performs scoring in real time.

8. The computer system as recited in claim 1, wherein the confidence score is calculated based on analysis of the advertisement fraud data, wherein the confidence score is calculated to detect fraud done by the online publisher in displaying advertisements on a plurality of devices.

9. The computer system as recited in claim 1, wherein the advertisement fraud data collected from the plurality of sources is correlated with facilitation of the blacklisting system.

10. A computer-implemented method for utilization of an advertisement fraud data to blacklist or whitelist one or more entities, the computer-implemented method comprising:
collecting, at a fraud detection system with a processor, the advertisement fraud data associated with online advertisement and commerce fraud in real-time, wherein the advertisement fraud data is collected from a plurality of sources, wherein the advertisement fraud data is collected based on a plurality of techniques;
creating, at the fraud detection system with the processor, a blacklist of one or more entities from the collected advertisement fraud data, wherein the blacklist of the one or more entities is created by a blacklisting system, wherein the blacklist of the one or more entities is created based on a plurality of parameters, and wherein the blacklist of the one or more entities is created based on a confidence score calculated from a plurality of reason codes corresponding to at least one of the plural parameters, wherein the calculation of the confidence score comprises adding the plural reason codes for each of the plural parameters;
blocking, at the fraud detection system with the processor, the one or more entities present in the created blacklist in real-time, wherein the one or more entities are blocked based on the plurality of parameters, wherein the plurality of parameters comprises publisher type, device ID, device type, a time period, traffic and IP address;
generating, at the fraud detection system with the processor, a whitelist of one or more entities from the created blacklist of the one or more entities, wherein the whitelist of the one or more entities is created by the blacklisting system, wherein the whitelist of the one or more entities is created based on the plurality of parameters, wherein the whitelist of the one or more entities is created based on a scoring mechanism; and
optimizing, at the fraud detection system with the processor, the blacklist of the one or more entities in real-time, wherein the optimizing of the blacklist of the one or more entities comprises utilizing weights on each of the plural parameters and multiplying the same to each of the plural reason codes, wherein the optimizing is done for fine tuning and improving accuracy of the created blacklist, wherein the optimizing is done using a feedback loop to ensure that no invalid blacklisting of the one or more entities is done.

11. The computer-implemented method as recited in claim 10, wherein the plurality of sources comprises of a plurality of devices associated with a plurality of users, and a plurality of third party fraud detection system.

12. The computer-implemented method as recited in claim 10, wherein the advertisement fraud data comprises application size, time to download, time to run, redirection time, click to install, click to run, user click time, device load time, time to run, time to install, network download time, application usage time, application idle time and application opening time.

13. The computer-implemented method as recited in claim 10, wherein the plurality of techniques comprises tracking online activity of the plurality of users, tracking interaction of the plurality of users with advertisements, and utilization of historical data.

14. The computer-implemented method as recited in claim 10, wherein the plurality of reason codes comprises at least one of click to install time, hourly distribution, anonymous installs, organic stuffing, invalid device ID, IP frequency, and incent mixing.

15. The computer-implemented method as recited in claim 10, wherein the blacklisting system comprises of a blacklist optimizer and a whitelist optimizer.

16. The computer-implemented method as recited in claim 10, wherein the scoring mechanism score each of the one or more entities, wherein the scoring mechanism perform the scoring using past advertiser data and current advertiser data, wherein the scoring mechanism performs the scoring in real time.

17. The computer-implemented method as recited in claim 10, wherein the confidence score is calculated based on analysis of the advertisement fraud data, wherein the confidence score is calculated to detect fraud done by the online publisher in displaying advertisements on a plurality of devices.

18. The computer-implemented method as recited in claim 10, wherein the advertisement fraud data collected from the plurality of sources is correlated with facilitation of the blacklisting system.

19. A non-transitory computer-readable storage medium encoding computer executable instructions that, when executed by at least one processor, performs a method for utilization of an advertisement fraud data to blacklist or whitelist one or more entities, the method comprising:
collecting, at a computing device, the advertisement fraud data associated with online advertisement and commerce fraud in real-time, wherein the advertisement fraud data is collected from a plurality of sources, wherein the advertisement fraud data is collected based on a plurality of techniques;
creating, at the computing device, a blacklist of one or more entities from the collected advertisement fraud data, wherein the blacklist of the one or more entities is created by a blacklisting system, wherein the blacklist of the one or more entities is created based on a plurality of parameters, and wherein the blacklist of the one or more entities is created based on a confidence score calculated from a plurality of reason codes corresponding to at least one of the plural parameters, wherein the calculation of the confidence score comprises adding the plural reason codes for each of the plural parameters;
blocking, at the computing device, the one or more entities present in the created blacklist—in real-time, wherein the one or more entities are blocked based on the plurality of parameters, wherein the plurality of parameters comprises publisher type, device ID, device type, a time period traffic and IP address;
generating, at the computing device, a whitelist of one or more entities from the created blacklist of the one or more entities, wherein the whitelist of the one or more entities is created by the blacklisting system, wherein the whitelist of the one or more entities is created based on the plurality of parameters, wherein the whitelist of the one or more entities is created based on a scoring mechanism; and
optimizing, at the computing device, the blacklist of the one or more entities in real-time, wherein the optimizing of the blacklist of the one or more entities comprises utilizing weights on each of the plural parameters and multiplying the same to each of the plural reason codes, wherein the optimizing is done for fine tuning and improving accuracy of the created blacklist, wherein the optimizing is done using a feedback loop to ensure that no invalid blacklisting of the one or more entities is done.

* * * * *